United States Patent Office 3,663,631
Patented May 16, 1972

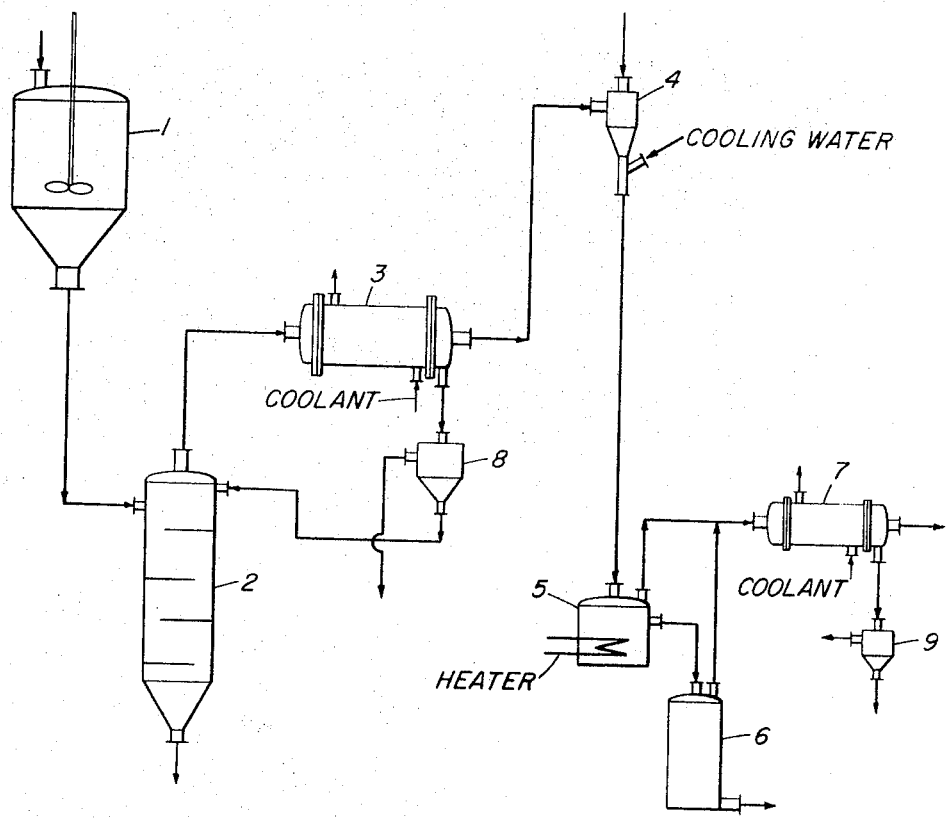

3,663,631
METHOD OF RECOVERING UNREACTED MONOMERS
Kenji Takeya and Mitsutoshi Okazaki, Okayama, and Toshiyuki Kobashi, Tsukubo-gun, Japan, assignors to American Cyanamid Company, Stamford, Conn.
Filed Apr. 24, 1970, Ser. No. 31,482
Int. Cl. C07c *121/32, 21/08, 21/06*
U.S. Cl. 260—654 S
10 Claims

ABSTRACT OF THE DISCLOSURE

A process for recovering unreacted monomers from a polymerization reaction mixture comprising acrylonitrile and a water-insoluble monomer of lower boiling point than acrylonitrile is disclosed which process comprises distilling said monomers from the reaction mixture under vacuum, recovering acrylonitrile and a portion of said water-insoluble monomer in a first condensation step under vacuum, recovering additional water-insoluble monomer by a second condensation at normal pressure in water at a ratio of monomer to water too low for stratification and and decantation, distilling low-boiling monomer from said second condensate, and recovering said low-boiling monomer as a third condensate at a ratio of monomer to water suitable for stratification and decantation.

---

This inventin relates to a process for recovering unreacted monomer from an aqueous polymerization reaction mixture. More particularly, this invention relates to a process for recovering acrylonitrile and a water-immiscible copolymerizable monomer having a boiling point below that of acrylonitrile from a polymerization reaction mixture containing water polymer, unreacted acrylonitrile and unreacted low-boiling water-immiscible monomer.

In commercial processes of polymerization, whether of batch or continuous type, some unreacted monomer generally remains in the polymerization reaction mixture. In some instances, it may be desirable to obtain a polymer at low monomer conversion in order to minimize discoloration and molecular weight variation in the formed polymer and in such instances it is economically important to recover unreacted monomer. Various processes have been proposed for recovering unreacted monomer from polymerization reaction mixtures. The usual procedure involves distillation under reduced pressure so as to minimize discoloration and denaturation of the formed polymer. The distillate which contains monomer is then condensed and the monomer recovered. Monomer recovered in this manner can be employed in the monomer feed in subsequent polymerization reactions.

Acrylonitrile is a preferred monomer in numerous polymerization reactions and is generally polymerized in an aqueous medium, i.e. by emulsion or dispersion technique. For many purposes, the polymers of acrylonitrile obtained by such techniques are those which contain a major portion of acrylonitrile and a minor portion of one or more monomers copolymerizable with acrylonitrile. In recovering unreacted monomer from aqueous polymerization reaction mixtures containing acrylonitrile and another monomer, problems can arise due to the fact that water is co-distilled with the unreacted monomers. In condensing the distillate therefore, care must be exercised to avoid use of coolants in the condenser jacket at temperatures which lead to freezing of the water formed as a co-condensate so as to avoid plugging of the condenser. In those instances where all monomers have a boiling point which is at least equal to or higher than that of acrylonitrile, no special problems in recovery of unreacted monomer is occasioned since condenser coolant temperatures normally employed to recover acrylonitrile are also effective for unreacted monomers of boiling points equal to or greater than that of acrylonitrile. A particular problem results, however when monomers used in conjunction with acrylonitrile have boiling points lower than that of acrylonitrile, particularly when such monomers are also water-immiscible.

The problem associated with recovery of unreacted monomers from an aqueous polymerization reaction mixture based on acrylonitrile and a water-immiscible monomer of lower boiling point than acrylonitrile stems from the fact that the temperature of condenser coolant is limited to avoid freezing of water in the condensate and plugging of the condenser. The lower temperature limit of the coolant is not sufficiently low to provide complete condensation of low-boiling water-immiscible monomer in the distillate, with the result that uncondensed low-boiling water-immiscible monomer escapes through the discharge of the vacuum-creating device and is lost. When the low-boiling monomer is water-miscible, improved recovery of such monomer is occasioned by mixing or dissolving of such monomer distillate in condensed water, but, of course, such mixing or dissolving is not possible with a low-boiling water-immiscible monomer distillate and recovery is effective only to the extent realized by coolant efficiency at the lower temperature limit thereof. Accordingly, there is needed a process for recovering unreacted monomers from an aqueous polymerization reaction mixture formed by copolymerization of acrylonitrile with another monomer, said other monomer being water-immiscible and having a boiling point lower than that of acrylonitrile.

In accordance with the present invention there is provided a process for recovering unreacted monomers from a polymerization reaction mixture resulting from copolymerization of acrylonitrile with a water-immiscible monomer having a boiling point lower than that of acrylonitrile, which process comprises distilling water and unreacted monomers from said reaction mixture so as to produce a polymerization reaction mixture substantially free of unreacted monomers, partially condensing said distillate to form a first condensate comprising water, essentially all of the acrylonitrile in said distillate, and a portion of the water-immiscible low-boiling monomer, stratifying and decanting monomers from said first condensate and recycling the residue of said first condensate to said distillation step, feeding the remaining distillate into water at normal pressure so as to form a second condensate comprising water and essentially the balance of water-immiscible low-boiling monomer distilled, said second condensate having a ratio of monomer to water too low for effective stratification and decantation, heating said second condensate to a temperature above that at which an azeotrope forms so as to vaporize a greater portion of monomer and a lower portion of water than is contained in said second condensate, condensing the vapors from the heated second condensate to form a third condensate comprising water and essentially all of the water-immiscible low-boiling monomer contained in said second condensate, said third condensate having a ratio of monomer to water suitable for stratification and decantation, and stratifying and decanting monomer from said third condensate.

The process of the present invention enables recovery of water-immiscible low-boiling monomer in amounts in excess of 95% of that amount present as unreacted monomer in the polymerization reaction mixture as well as essentially complete recovery of acrylonitrile and other monomers conventionally employed therewith and thus provides considerable economic advantages in such polymerization reactions. The process of recovery enables the recovered monomers to be employed directly, in subsequent polymerization reactions. The process is especially advantageous where low monomer conversions are achieved. The process also minimizes losses of monomer by discharge from vacuum devices and thus minimizes pollution problems.

The process of preparation of the polymerization reaction mixture follows conventional procedures and the present invention is only concerned with removal of unreacted monomers from certain of the polymerization reaction mixtures. The polymerization reaction mixtures to which the process of the present invention is directed are those containing an aqueous medium, polymer, unreacted acrylonitrile and an unreacted water-imiscible monomer having a boiling point less than that of acrylonitrile. In preparing the initial mixture, monomers, water, polymerization initiators, and pH regulators are employed. The resulting mixture is then generally heated to initiate the polymerization which then continues as prescribed by the conditions employed. During the course of the polymerization various additions may be made, such as additional catalyst, additional monomer, additional pH regulators, additional water, and, if desired, molecular weight regulators. Eventually the polymerization reaction subsides and the desired polymer is present in the polymerization reaction mixture. In most instances, due to equilibrium effects, the final polymerization reaction mixture contains unreacted monomers. The total amount of unreacted monomers will vary generally in any given instance and will depend on many factors including relative reactivity rates of individual monomers, temperature of polymerization reaction, amount and nature of initiator or catalyst employed, ratio of total monomer content to aqueous medium, presence or absence of molecular weight regulators or short-stopping agents, pH of the reaction mixture, and many others.

In preparing a polymerization reaction mixture containing acrylonitrile and low-boiling water-immiscible monomer, it is possible to employ other monomers as well, if desired. Numerous literature is available to indicate the conventional monomers normally employed in copolymerizations with acrylonitrile. Many of the conventional monomers employed with acrylonitrile have boiling points that are equal to or higher than that of acrylonitrile or have sufficient water-miscibility to obviate monomer recovery problems. While the present process contemplates use of such monomers in conjunction with acrylonitrile, in such instance there must also be present a low-boiling water-immiscible monomer as well. Others of the conventional monomers employed with acrylonitrile are low-boiling water-immiscible monomers of the type to which the process of the present invention is directed. Still other monomers copolymerizable with acrylonitrile may not have reached the status of conventional monomers because of the very problem of recovery of unreacted monomer and the present process, by providing for recovery of low-boiling water-immiscible unreacted monomers, enables economic use to be made of such monomers.

In considering recovery of a low-boiling water-immiscible monomer, two limits must be considered. Since acrylonitrile is used in conjunction with the low-boiling water-immiscible monomer and the boiling point of acrylonitrile is 77.3° C. at standard conditions, the low-boiling monomer must have a boiling point below that of acrylonitrile in addition to being water-immiscible. Since the freezing point of water is 0° C. and the process of the present invention operates with water in fluid form, the boiling point of the low-boiling water-immiscible monomer must be above 0° C. It can be readily appreciated that if the boiling point of the low-boiling monomer is very close to 77.3° C., the monomer can be recovered to a practical extent using conventional recovery processes. It can also be readily appreciated that if the boiling point of the low-boiling monomer is very close to 0° C., it will be difficult to recover the monomer to a practical extent by the process of the present invention. Accordingly, for practical purposes, the effective range of boiling points for water-immiscible monomers to be recovered by the process of the present invention is from about 10° C. to about 70° C. A preferred range is from 15–55° C.

Among the water-immiscible low-boiling monomers that can be recovered according to the process of the present are, for example vinylacetylene, allyl chloride, allyl fluoride, vinyl cyclopropane, acrolein, vinyl bromide, 1-bromo - 2,2 - difluoroethylene,1-bromo-2-fluoroethylene, 1-chloro-2-fluoroethylene, vinylidene chloride, vinyl trifluoroacetate, allylvinyl ether, vinyl ether, ethylisopropenyl ether, methylvinyl ether, propylvinyl ether, and isopropylvinyl ether.

The process of the present invention is effective over a wide range of contents of unreacted monomers in the polymerization reaction mixture. While from an economic viewpoint the amount of monomer to be recovered, the value of the recovered monomer, and the cost of the recovery process may be factors to be dealt with in considering a monomer recovery process, problems of pollution in the absence of monomer recovery process must also be considered. Thus, while the process of the present invention offers considerable economic advantages at a wide range of unreacted monomer contents, the process also avoids pollution problems at levels of unreacted monomer that are below that offering economic advantage.

The process of the present invention is carried out under reduced pressure, preferably below about 300 millimeters of mercury, absolute, and at a temperature of less than about 75° C. in distilling monomers from the polymerization reaction mixture. As the means for providing reduced pressure, the present process contemplates use of vacuum-forming devices that employ water as the operating fluid, i.e. as sealant and lubricant. Customary devices that form vacuum using water as the operating fluid include piston pumps, water jet pumps, and steam ejectors, the latter being preferred. It is in conjunction with the operating fluid of the vacuum-forming device that the high recovery of low-boiling water-immiscible monomer is achieved.

A preferred embodiment of the present invention is illustrated in FIG. 1, the sole figure of the present invention. FIG. 1 is a flow diagram of the process illustrating the process and the equipment useful in carrying out the process. The process of the present invention is next described with a particular reference to FIG. 1. A reactor 1 for a continuous polymerization reaction process contains the suitable polymerization reaction mixture which discharges from the bottom of the reactor 1 at a predetermined rate coincidental with the polymerization process. The discharge from reactor 1 flows into steam-stripper 2 at a point near the top of the stripper 2 and flows down the stripper 2 and eventually out the bottom thereof. The polymerization reaction mixture encounters various shelves in the stripper and is heated by counter-flowing steam at a temperature sufficient to volatilize unreacted monomers from the reaction mixture at the reduced pressure formed by steam ejector 4. Exiting from the bottom of steam stripper 2 is the polymerization reaction mixture essentially free of unreacted monomer content. The volatiles from steam stripper 2, which include steam and unreacted monomers, are led to condenser 3 which has coolant fed through its outer jacket. The condensate from condenser 3, which includes essentially all of the acrylonitrile volatilized, all of the stream, and a portion of the low-boiling monomer, discharges into decanter 8. The condensate in decanter 8 is then stratified and monomer decanted at the side port while the residue is recycled to steam stripper 2. The remaining volatiles, which have not been condensed in condenser 3 enter into the operating fluid of steam ejector 4 and are no longer under reduced pressure. The operating fluid, which enters at the upper port of steam ejector 4, exits at the lower port thereof and enters heating tank 5. Cooling water enters the operating fluid at the lower side port of steam ejector 4 to promote condensation of low-boiling monomer. The fluid, which is a mixture of condensed low boiling monomer and water has a ratio of monomer to water too low for stratification and decantation. The fluid, entering heating tank 5, is heated to a temperature above the temperature at which an azeotrope of water and monomer forms and provision is made for volatiles formed to exit through a top port to condenser 7. The heated fluid in heating tank 5 is then passed as a spray down into flush tank 6 and monomer volatilized therein also exits to condenser 7. The flush tank 6 is generally operated with a counter-current flow of inert gas to aid in volatilizing monomer. The volatiles emanating from heating tank 5 and flush tank 6 are condensed in condenser 7 by use of coolant. The discharge from flush tank 6, emanating at the lower port, is water essentially free of unreacted monomers and may be recycled where necessary or discarded. The condensate formed in condenser 7, which contains water and substantially the balance of low-boiling monomer volatized from steam stripper 2, drains into decanter 9. The condensate is of a ratio of monomer to water suitabe for stratification and decantation and, accordingly, is stratified. Monomer is decanted at the side port and residue is discarded.

The invention is further illustrated by the following example in which all percentages are by weight.

EXAMPLE 1

A polymerization reaction mixture was prepared in accordance with a conventional continuous procedure. The reactor employed was provided with suitable agitation and maintained at a temperature of 55° C. The monomer feed consisted of 84% acrylonitrile, 7% methyl acrylate, and 9% vinylidene chloride. The catalyst comprised sodium chlorate and sodium sulfite at a molar ratio of 1 to 3, respectively. Nitric acid and water were also fed into the reactor continuously as necessary. The average residence time for a unit volume of polymerization reaction mixture in the reactor was 70 minutes. The reaction was conducted as a suspension polymerization with a charge of monomer equal to 24% of the total weight of monomer and water. The amount of nitric acid added was sufficient to maintain the reaction pH at 2.3. The catalyst feed was controlled to maintain sodium chlorate at 0.6% based on the total weight of monomer added. The polymerization reaction mixture discharged from the reactor had the following composition:

|   | Percent |
|---|---|
| Polymer | 19.1 |
| Unreacted acrylonitrile | 4.04 |
| Unreacted methyl acrylate | 0.48 |
| Unreacted vinylidene chloride | 0.38 |
| Water | 76.00 |

The above polymerization reaction mixture was processed according to the embodiment illustrated in FIG. 1. The polymerization reaction mixture discharged from reactor 1 was fed into steam stripper 2 and maintained at a temperature of 52° C. by a countercurrent feed of steam. The steam stripper had four shelves, as shown, and was maintained at a pressure of 100 millimeters of mercury, absolute, by means of steam ejector 4. Analysis of polymerization reaction mixture discharged from steam stripper 2 indicated that greater than 99% of the unreacted monomer content had been volatilized. The distillate from steam stripper 2 was fed to condenser 3 which was cooled with coolant at a temperature varying between 0 and 2° C. The condensate of condenser 3 was drained into decanter 8 and stratified. Monomer was decanted and the residue was recycled to steam stripper 2. At the completion of the run, there was recovered from decanter 8 99% of the acrylonitrile and methyl acrylate as well as 35% of the vinylidene chloride contained as unreacted monomers in the polymerization reaction mixture. The distillate from steam stripper 2 which was not condensed in condenser 3 passed into the operating fluid of steam ejector 4 and thus recovered normal atmospheric pressure. Cooling water varying in temperature between 0 and 2° C. passing into the operating fluid of steam ejector 4 condensed the low-boiling monomer. At this point the ratio of the total weight of condensed low-boiling monomer to the total weight of water was too low for the mixture of low-boiling monomer and water to be processed effectively by stratification and decantation. The mixture of condensed low-boiling monomer and water was passed to heater 5 where it was heated to 55° C. Volatiles from heater 5 were led to condenser 7. The heated mixture in heater 5 was sprayed into flush tank 6 and a current of nitrogen flowed countercurrent to the mixture in order to volatilize the low-boiling monomer. Volatiles from flush tank 6 were also led to condenser 7. The volatiles were condensed in condenser 7 employing coolant at a temperature varying between 0 and 2° C. Condensate from condenser 7 consisted of low-boiling monomer and water, with the ratio of monomer to water being suitable for processing by stratification and decantation. The condensate from condenser 7 was drained into decanter 9 and stratified. Monomer was decanted and the residue discarded. The amount of low-boiling monomer recovered from decanter 9 was 95% of that entering the operating fluid of steam ejector 4. Total recovery of low-boiling monomer present in the polymerization reaction mixture processed according to the present invention was 96.7%.

We claim:

1. A process for recovering unreacted monomers from an aqueous polymerization mixture resulting from copolymerization of acrylonitrile and another monomer which other monomer is water-immiscible and has a boiling point in the range of 10° C. to 70° C. at standard conditions, said mixture comprising water, copolymer, acrylonitrile, and said other monomer, which process comprises the steps of:

(1) distilling unreacted monomers from said mixture at a temperature less than about 75° C. under reduced pressure so as vaporize water, acrylonitrile, and said other monomer from said mixture and to leave said mixture substantially free of unreacted monomers;

(2) condensing vapors from step (1) so as to form a first condensate comprising water, acrylonitrile, and said other monomer, leaving vapors consisting essentially of said other monomer;

(3) stratifying and decanting monomers from said first condensate and recycling the residue to step (1);

(4) feeding the uncondensed vapors remaining from step (2) into water at normal pressure to condense the remaining monomer therein so as to form a second condensate consisting essentially of said other monomer and water, said second condensate being unsuitable for processing by stratification and decantation;

(5) distilling said second condensate at a temperature above that at which an azetrope of said other monomer and water is formed so as to vaporize said other monomer from said condensate;

(6) condensing the vapors from said step (5) to form a third condensate consisting essentially of said other monomer and water, said third condensate being suitable for processing by stratification and decantation; and (7) stratifying and decanting said other monomer from said third condensate.

2. The process of claim 1 wherein said other monomer is vinylidene chloride.

3. The process of claim 1 wherein said other monomer has a boiling point in the range of 15° C. to 55° C.

4. The process of claim 1 wherein said reduced pressure is below about 300 millimeters of mercury, absolute.

5. The process of claim 1 wherein reduced pressure is obtained by ejection of steam into water.

6. The process of claim 1 wherein the water into which vapors are passed in step (4) is the operating fluid employed in obtaining reduced pressure by ejection of steam into water.

7. The process of claim 1 wherein in step (5) wherein an inert gas flow is used to assist vaporization of said water-immiscible monomer.

8. The process of claim 1 wherein there is present an additional monomer copolymerizable with acrylonitrile, said additional monomer having a boiling point equal to or higher than that of acrylonitrile or being water-miscible.

9. The process of claim 8 wherein said additional monomer is methyl acrylate.

10. The process of claim 1 wherein said distilling temperature in step (1) is 52° C.

References Cited

UNITED STATES PATENTS 3,553,248   1/1971   Wakita et al. _____ 260—465.9

JOSEPH PAUL BRUST, Primary Examiner

U.S. Cl. X.R.

260—465.9, 486 R, 487, 601 R, 616; 653.3, 656 R, 666 A, 678